Patented Oct. 16, 1945

2,386,924

UNITED STATES PATENT OFFICE 2,386,924

PRODUCTION OF HEAVY RUMS

Rafael Arroyo, Rio Piedras, P. R.

No Drawing. Application January 13, 1943, Serial No. 472,250

11 Claims. (Cl. 195—13)

This invention relates to the production of heavy rums by fermentation of blackstrap molasses.

The so-called "heavy rums" have usually been differentiated from the more common type known in the trade as "light rums" by their corresponding "non-alcohol number coefficient" or "coefficient of impurities," as well as by physical or organoleptic differences of body, taste and aroma. A heavy rum is regarded as possessing a higher "non-alcohol number" and a richer and more intense taste and aroma than a light rum. A heavy rum is also distinguished in possessing a very high "index of persistence" in both aroma and taste; by which is meant that it can endure high diluting with aqueous solutions of neutral spirits before its characteristic aroma and taste can no longer be perceived by an experienced rum taster.

While the heavy type of rum has been manufactured in the past and is being produced at present, most of the methods hitherto followed have been of a haphazard or empirical nature and therefore coupled with uncertainty and perils in execution. The final results of these "modi operandi" have been detrimental to the quality of the finished product, to the economy of the process, or to both. These facts have been evidenced in practice by the preference shown by the consuming public toward the light rums. Two main reasons exist for this public attitude: (1) The few wholesome, genuine, heavy rums on the market are too expensive for the average purchaser; (2) most of the low-priced heavy rums on the market are improperly fermented and distilled, or are artificially concocted. For instance, it has been sought to manufacture heavy rums by merely changing the method of distillation as used in the manufacture of light rums, so that more of the so-called "head products" are allowed to pass over into the main distillate or raw commercial rum. This was thought to increase the "non-alcohol number" and to add the necessary extra flavor and aroma. These attempts, however, have always failed to produce a first-class, genuine, heavy rum, since what is really accomplished by such procedure is the addition to the main distillate of undesirable congenerics of the alcoholic fermentation, being in fact the very same products that are so very carefully and painstakingly eliminated from the distillate when manufacturing light rums. Obviously, a carelessly distilled light rum is not a first-class, genuine, heavy rum.

It has been found that the presence of certain bacteria in the fermenting alcoholic medium aids in securing flavor and aroma for the resulting rum, and a second prior practice has been to carry the rum fermentation forward in a substrate which was purposely badly infected and in which all kinds of unidentified bacteria and other microorganisms have competed with the cultured rum yeast strain in the fermentation of the sugars present in the mash. The success or failure of such a method of heavy rum making depends on the kind and extent of the infection present. Even when successful as to the quality of the product obtained, when by chance or luck the right kind of bacteria and only such are present as the infecting organisms, this unscientific practice leads to poor results with regard to yields and fermentation efficiencies, thus adversely influencing the economy of the process.

It has now been found that heavy rums of excellent type and with high yields and fermentation efficiencies can be obtained by a procedure comprising:

(1) The subjection of the raw material to a pre-treating operation which fits it for its intended use.

(2) The selection of yeast and bacterial cultures adapted for symbiotic fermentation of heavy rum mashes.

(3) The employment of optimum conditions for the production of alcohol and symbiotic fermentation for the production of aroma and flavor, wherewith to obtain high yields and fermentation efficiencies with a rapid fermentation, and a high quality of final product.

(4) The employment of a proper distillation method for the resulting beers.

As an illustrative practice of the invention, the procedure may start with employment of a blackstrap sugar cane molasses. A Puerto Rican blackstrap molasses usually has a pH from 5.2 to 6.2; and a density (Brix) of 83 to 90 degrees, usually around 86 degrees. This blackstrap molasses is pre-treated for improving it chemically, physically and bacteriologically. For this purpose, a cylindrical iron tank is equipped with a thermometer, steam-heating coils, and a motor-driven mechanical stirrer. It is preferred also to connect it to the still condenser outlet by means of a pipe line, so that hot water from the condenser may be supplied into this pre-treatment tank, to afford saving of heat units during the pre-treating operations.

The molasses is brought into the pre-treating tank and mixed with a predetermined amount of milk of lime which is calculated to raise the pH of the molasses by 0.5 pH unit, the actual amount to be employed for treating the introduced weight of molasses being determined experimentally according to the density and original pH of the raw material, and the amount treated per batch. After introducing the milk of lime, the stirrer is set in motion and hot water is added with vigorous stirring until the resulting mixture attains a density of between 55 and 65 degrees Brix, preferably 60 degrees for normal Puerto Rican molasses. The hot water is then shut off, and the temperature of the mixture adjusted by introducing steam if necessary, so that a temperature between 80 and 85 degrees C. is attained; and this temperature is then maintained in the pre-treating tank for fifteen minutes to one or more hours, depending upon the purity of the molasses, the equipment available and the schedule of operation, etc. The molasses mixture remains below pH 7.0; that is, it is less acid but not definitely alkaline during the pre-treatment.

While still strongly agitating, the mixture is then passed through a separating device such as a super-centrifuge or filter for separating solid organic and inorganic impurities, such as molasses gums and ash which have been precipitated or separated during the alkaline and heat treatment just described. The clean run-off, in the form of a thick mash, is then delivered into a second pre-treating tank which is similarly equipped, with the exception that the coils are connected for water cooling. As soon as the coils are covered by the inflowing thick mash, cold water is introduced and the agitation is continued during the entire cooling period. When the temperature has dropped to about 35 to 40 degrees C., there is added to the tank contents enough ammonium sulphate and calcium superphosphate to compensate any deficiencies in nitrogen and phosphoric acid of the raw material. Uusually, when working with Puerto Rican molasses, it is found desirable to add 0.5 percent of ammonium sulphate and 0.1 percent of calcium superphosphate on the weight of the molasses used. Immediately after the incorporation of these nutriments and while still agitating, strong sulphuric acid is added until a new pH value of between 5.5 and 5.6 is obtained. The tolerance range of pH values for rum yeasts is 3.5 to 6.0, with an optimum at 4.5 to 5.2, while *C. saccharobutyricum* tolerates pH 4.7 to 7.0 with an optimum at pH 5.8 to 6.4. It has been found that the optimum for symbiotic working of the yeast and bacteria lies at around pH 5.5 to 5.6, for the production of these heavy rums; and it is preferred to observe this throughout, both for simplicity of control and for avoiding shock to the organisms when they are brought together.

The mass is then passed passed through a second filter or super-centrifuge for separation of newly precipitated solid impurities. The cleaned, purified and conditioned thick mash thus resulting is delivered to a receiving and storage tank, from which it is drawn as needed for mashing operations.

This pre-treatment has eliminated large proportions of molasses gums, ash, infective microorganisms, and mechanical impurities, by the combined effects of temperature conditions, relative alkalinities in the several stages, and an inversion of saccharose has been initiated by reason of the final pH value established.

The yeast strain used should be of a type adapted to the fermentation of heavy rums. All yeast strains are not suitable for the production of genuine heavy rums, and not even all varieties of rum yeasts will serve. It is therefore necessary to carefully select a strain of heavy rum yeast. The best class of rum yeasts for the production of heavy rums are to be found among the Schizosaccharomyces or fission yeasts, but a few strains of the budding type can also be employed with success. A characteristic of a proper rum yeast for the production of heavy rums in accordance with the instant process is that it should be able to stand moderate but appreciable concentrations of organic acids during the alcoholic fermentation, particularly saturated aliphatic fatty acids such as acetic, propionic, butyric, valeric, and others yet higher in the series. Further, it should be a good producer of the enzyme esterase, since this particular enzyme acts catalytically in the fermenting medium to bring about the valuable esterification between the various organic acids and alcohols present therein. The yeast must be capable of continuing its fermentation effect at temperatures between 27 and 33 degrees C., and cooperate symbiotically with the bacteria utilized as auxiliary fermentation agents: the strain of rum yeast employed was found tolerant to temperatures as low as 25 degrees C., either alone or in the presence of the bacteria.

The yeast strain is prepared to form a footing for seeding the fermenters by starting propagation every day at the distillery laboratory from an agar slant containing a pure culture of the yeast. By known methods of bacteriological technique, a portion of this pure culture is transferred to a biological test tube containing 25 ml. of sterile molasses mash. When this seeded mash has reached vigorous fermenation, a new transfer is made into a 500 ml. Erlenmeyer flask containing about 400 ml. of sterile mash, and such transfers are made in succession as vigorous fermentation occurs, until a seed culture of about 5 gallons volume has been built up in the laboratory. This culture is employed as inoculum for the first vessel of the plant yeasting equipment.

A cooperative bacterial ferment is also developed in the laboratory for introduction into the fermenter. It is preferred to employ *Clostridium saccharobutyricum* as set out below. The stock culture of these bacteria may be kept in spore form in sterile soil and is activated into its vegetative form prior to its use for building the required seed. The laboratory seed is developed in essentially the same fashion as described for the yeast footing.

The fermentation of molasses is illustratively accomplished in a batch procedure by causing the thick mash to flow from the receiving tank into a thin mashing machine, where the thick mash is diluted by additional water to the required density. It is very important that the density of the thin fermenter mash be kept at such a value that the total sugars concentration per 100 ml. shall not exceed a limit between 12.0 and 13.0 grams. The thin mashing control is determined by grams of total sugars per 100 ml. of mash rather than by the Brix densities; but for a given plant operating on a substantially standard molasses input, the mashing operator soon learns the Brix density range corresponding to the aforesaid sugars concentrations, and can employ the Brix density as a simple means of controlling the mash dilution. The density for a thin mash from usual Puerto Rican blackstrap molasses is between 9.0 and 21.0 Brix depending upon the sugars content. It is preferred to maintain the sugars concentration as high as possible, but a lower concentration than 12 grams per 100 ml. may be employed if desirable with a particular molasses or yeast or bacterium.

The maximum initial total sugars concentration of 13 grams per 100 ml. has been selected to the benefit of the bacteria, as most bacteria of the propionic and butyric groups do not tolerate the sugars at much above 6 grams per 100 ml., and are also inhibited by alcohol concentrations of 8 percent by volume, or above. Since 13 grams per 100 ml. does not yield over 8 percent by volume (probable yield, 7.0 to 7.5 percent), a safety factor is provided regardless of the yeast action. Since the total sugars are reduced to about 6.0 grams per 100 ml. at bacterial seeding, the consequent alcohol concentration will not exceed 4 percent by volume, and the bacteria are then well able to proceed with their own work and in the symbiosis.

The fermenter first receives an active vigorous yeast footing before the thin mash is introduced. This footing should amount to between 5 and 20 percent, and preferably is about 10 percent of the total working volume of the fermenter; as this assures a rapid start of the fermentation without involving the complications inherent to the preparation of a very large footing, especially if the fermenter is of very large capacity. The fermenters may be of the closed type, constructed of polished iron or steel, and provided with mash cooling devices and means for agitating the mash either mechanically or by the admission of jets of carbon dioxide gas at the bottom, this carbon dioxide being obtained from another actively going fermenter, or from compressed carbon dioxide containers. Agitation by means of air or oxidizing gas is not recommended, on account of the detrimental effect upon the anaerobic bacteria. It is preferred to provide the fermenter with continuous recorders for temperature and pH value.

The thin mash is added upon the yeast footing in the fermenter, with a gentle stirring or agitation of the contents, so as to provide thorough and even distribution of the seed yeast. When all of the mash has been added, the pH value is noted, and the contents are corrected to a value between 5.5 and 5.6 by the addition of either sulphuric acid or milk of lime, as the case may require. The setting temperature should be between 30 and 32 degrees C.

Fermentation is allowed to proceed under temperature control within a range of 30 to 33 degrees C. preferably accomplished by means of cooling coils placed outside of the fermenters and through which the mash may be circulated whenever temperature correction becomes necessary. After the sixth hour of actual fermentation, tests are made for the mass of total sugars percent in grams per 100 ml. of mash. Likewise, determinations of alcoholic concentrations in percentage by volume are thereafter effected every two hours. When the percentage of alcohol by volume is about 3.5 to 4.0 percent and the grams of sugar per 100 ml. of mash have a value below 6.0 grams, the conditions are ready for the incorporation of the bacterial footing to the fermenting mash.

The fermenting mash is firstly corrected in pH value to a reading of between 5.5 and 5.6, if necessary. The pH value of the bacterial footing is similarly adjusted to essentially the same value, and then while gently stirring or agitating, the bacterial footing is added to the fermenter in an amount equivalent to 1 to 4 percent of the total volume of the fermenting liquid. It is preferred to employ 2 percent of bacterial footing when a yeast footing of 10 percent has been used under the above conditions, as the ratio of 1:5 appears to give an optimum result. The higher the ratio of bacteria: yeast up to 1:5, the heavier and more aromatic is the resulting rum, but when the ratio is much higher than 1:5, there is danger of obtaining uneconomically low total yields, since the faster propagation of the bacteria will overcome the yeast.

After the addition of the bacterial inoculum, greater care of temperature control is necessary, as it is then important that the temperature within the fermenter should not go much above 29 to 30 degrees C. Correspondingly, the pH value should be so controlled that it will never be below pH 5.0, while pH 4.0 is an absolute limit for action of the preferred Clostridium culture.

The fermentation is then allowed to proceed to a finish. In case higher alcoholic concentrations are desired than may be expected from the amount of initial sugars concentration in the mash, the sugars percent may be augmented by introduction of thick mash to the fermenter, with gentle stirring or agitation of its contents, when the total sugars concentration in the fermenter has dropped to a value between 2.0 and 2.5 grams per 100 ml. of mash. The quantity of thick mash introduced is determined by the amount required to produce the extra amount of alcohol desired; and care is observed to assure that an increase of alcohol concentration above 8 percent is not provoked until the desired bacterial action has occurred.

When using the culture of *Clostridium saccharobutyricum* which has been isolated and developed in practice of this invention, it has been found that the rate of alcoholic fermentation is greatly accelerated after its incorporation in the fermenter due to symbiotic effects. The fermentation will usually come to an end in from 28 to 36 hours, counting from the time of yeast inoculation.

The alcoholic yields based on the total sugars used have been found to vary between 44.0 and 46.0 percent, with corresponding fermentation efficiencies of 90 to 95 percent, based on Pasteur's equation for the alcoholic fermentation of sugars. When no extra sugars are added in the form of thick mash as above described, the usual alcoholic concentrations in the fermented mashes run from 7.0 to 7.5 percent by volume; while if additional thick mash has been introduced, the alcoholic concentration may be raised to 9.0 to 11.0 percent by volume.

In preparing heavy rums, distillation of the fermented mash is best conducted in a discontinuous or batch still provided with an efficient rectifying column and with facilities for effecting total reflux of the alcoholic vapors for a desired length of time. Continuous stills may be used when provided with an efficient pasteurizing column and when specifically designed for low-proof distillation, that is, when provided with four or five plates, or less, in the rectifying section of the column. However, preference is given to discontinuous distillation except for economical purposes in the case of very large installations.

In distilling, the resulting beer from the fermentation may be distilled directly, or it may be allowed a certain period of rest, varying from 12 to 18 hours. The latter practice is preferred and recommended, as it greatly improves the quality of the resulting rum.

In either case, the kettle of the batch still is charged, and the contents are carefully brought to gentle ebullition. This gentle boiling should be maintained during the whole distillation period, by careful control of the steam admitted to the coils of the kettle. At the beginning of the evaporation, the ascending alcoholic vapors are totally refluxed back to the column, for a time which is determined largely by the particular characteristics which it is desired to impart to the end product: it has been found that 1 to 2 hours of refluxing is appropriate in most cases. This refluxing increases the esterification and also causes the accumulation of low-boiling-point constituents at the top plates of the column, so that when the "head products" are permitted to separate, all of these products will pass off with a minimum total volume of distillate. Total refluxing is then terminated and the distillation proper begun. At the beginning of the separatory distillation, the "head products" should be taken off for an amount of these "foreshots" which is determined experimentally for each individual case and based on practice and experience: generally speaking and for orientation of the inexperienced in practice, from 0.5 to 1.0 percent of the total volume of the distilling mash should be separated as "head products." After these "head products" are collected, distillation of the "body" or main products is continued, while receiving these into a different container. When the distillation proof falls to an apparent degree of around 100, the distillate (comprised of the so-called fusel oil, and probably some sulfur compounds and organic volatile bodies probably of a xanthine composition; all having a very bad odor) is again led into the "head products" receiver until a new apparent proof of about 75 degrees is registered at the test gauge. At this point, the distillate is again led into the main products receiving tank until the end of the distillation period.

This body of main products, comprised of the second and fourth fractions, will average from 130 to 150 proof, depending on the original concentration of alcohol in the beer, the total time of refluxing given before starting the distillation proper, and the rate of distillation maintained during the operation.

Those portions of distillate which have been collected in the "head products" receiver, being the first and third fractions, may amount to about 10 to 15 percent of the total alcoholic liquors distilled. They may be stored in special receivers until enough has been accumulated to permit a separate further distillation. When so collected, they are first diluted to an alcoholic concentration of about 20 percent by volume, and then the foregoing distillation procedure is again effected thereon, with the exception that in this run the products separated from the body of main products, i. e., the first and third fractions are discarded. This second-run distillate provides a rum which does not have the same high quality as the main body, but constitutes a rum of good taste and aroma for sale at a relatively low price.

The described process of fermentation and distillation affords a very fine product due to the presence therein of valuable aromatic bodies and the exclusion therefrom of the deleterious aromatic bodies which heretofore have been eliminated by lengthy aging, with a minimum expense for maturing, since the raw rum so manufactured has been found to reach full maturity in but a fraction of the time usually allotted for the aging of these heavy rums. It has been found that three-year old rum manufactured by the aforesaid method has compared favorably with eight-year old heavy rums of the most famous Jamaica brands.

In the above description, reference has been made to the employment of the symbiotically active co-ferment in the form of bacteria which assists in providing the desired flavor and aroma constituents. A number of bacteria was found adequate and well suited for this purpose, particularly members of the propionic and butyric acid groups. The bacteria must conform to the following specifications:

(*a*) Their life activities should not be arrested too soon by the yeast metabolic products formed in the fermenting medium, particularly by ethyl alcohol.

(*b*) They must not attack or decompose, or materially change, the existing products of the yeast metabolism to such an extent as to materially reduce the yield of rum; that is, they should act upon the sugars and other materials of the molasses itself rather than upon the metabolic products of the yeast.

(*c*) They should possess the power of acting upon the residual sugars, following the initial alcoholic fermentation, utilizing these sugars in the elaboration of the products of their own metabolism.

(*d*) Their metabolic products should be of such character as of themselves to enhance the flavor and aroma of the resulting rum; or be of such nature that they will readily combine chemically with the metabolic products of yeast fermentation (particularly with ethyl alcohol) to form highly flavored aromatic compounds.

(*e*) They must be of such nature as will readily and fully act in the same class of substrate as required for the alcoholic production when the fermentation is properly conducted.

*Clostridium saccharobutyricum* was found in and isolated from sugar cane bagasse, and produces a mixture of valuable aliphatic acids, consisting principally of normal butyric, acetic and propionic acids, but including about one percent of other unidentified organic acids of higher molecular weights such as caproic and heptoic acids. The mixture of products consisted of about 90 percent normal butyric acid, about 8 percent acetic acid, and about 2 percent of propionic acid. No appreciable amounts of alcohols, aldehydes or ketones were found in the product of the particular culture of *C. saccharobutyricum* itself, although the fermented mass was found to contain propanol, iso and normal butanol, iso and normal pentanol, hexanol and heptanol, probably by the action of yeast in de-amination of the amino acids of degraded proteins. The effects of the fermentation and of the after treatment undoubtedy lead to the production of a wide range of possible esters.

This organism possesses the power of activating the yeast culture when acting symbiotically therewith in molasses mashes, under the aforesaid controlled conditions. The effect of this activation appears in the more rapid fermentation and formation of alcohol than when the yeast acted alone, in pure culture, in similar mashes. This effect is revealed in the much accelerated rate of fermentation following the addition of the bacterial culture to the fermenter.

It is found that the bacteria became inhibited whenever the sugars concentration of the medium was higher than about 6.0 grams of total sugars per 100 ml. of mash, or whenever the alcoholic concentration in the fermenting liquid was over 8.0 percent by volume, or whenever the pH decreased until it approached the value of 4.0. Therefore, the foregoing procedure includes the necessary steps for maintaining the pH well above 4.0, of withholding inoculation with the bacterial culture until the sugars in the fermenter are reduced to below about 6.0 grams per 100 ml. of mash, and of using such a total sugars concentration in the mashing operation that not over about 8.0 percent of alcohol by volume is present in the beer during the course of bacterial fermentation.

Studies of the heavy rum prepared by this procedure and of other heavy rums, such as those from the islands of Jamaica and Martinique, have revealed the fact that preponderance in the amount of "non-alcohol number" was not the most significant difference between "heavy" and "light" rums. Fractional distillations on both types of rums, supplemented by chemical and organoleptic tests performed on the individual fractions, have shown that the most striking difference consisted not so much in the size as in the individual composition of the portions constituting their respective "non-alcohol number." For instance, it was found that the individual esters and aldehydes in the "non-alcohol number" of light rums consisted almost totally of compounds of low boiling point and low molecular weight which pass over during the distillation of the first fraction; while in the case of heavy rums, the esters and aldehydes present consist to a very considerable proportion of compounds of high boiling point and high molecular weight which pass over with the fifth and sixth fraction during fractional distillation of standard analysis work. It was also found that the fusel oil content was higher in the case of light rums, in comparison to the total "non-alcohol number." The volatile and total acidities are much higher in heavy than in light rums.

In actual comparative analyses of a heavy rum and of a light rum the following differences were noted:

| | Heavy rum | Light rum |
|---|---|---|
| Index of persistence | 1:200,000 | 1:5000 |
| Alcohol by volume | 48.84 | 44.24 |
| Total acidity (mg. per 100 cc. A. A.) | 294.91 | 24.27 |
| Fixed acidity (mg. per 100 cc. A. A.) | 253.70 | 15.44 |
| Volatile acidity (mg. per 100 cc. A. A.) | 41.21 | 8.33 |
| Esters (mg. per 100 cc. A. A.) | 198.20 | 39.78 |
| Aldehydes (mg. per 100 cc. A. A.) | 55.70 | 25.90 |
| Higher alcohols (mg. per 100 cc. A.A.) | 82.94 | 40.41 |
| Extract (mg. per 100 cc. rum) | 1390.10 | 518.00 |
| Ash (mg. per 100 cc. rum) | 20.20 | 23.60 |
| Ratio esters: higher alcohols | 239:100 | 98:100 |
| Ratio esters: volatile acidity | 481:100 | 451:100 |
| Ratio esters: aldehydes | 356:100 | 154:100 |
| Ratio non-alc. no.: extract | 45:100 | 26:100 |
| Ratio vol. acidity: total acidity | 16:100 | 36:100 |
| Ratio ash: extract | 1.5:100 | 4.6:100 |
| Ratio high: low boiling esters | 80:100 | 37:100 |
| Ratio high: low boiling aldehydes | 98:100 | 97:100 |
| Ratio higher alc.: non-alc. no | 13:100 | 31:100 |
| Non alcohol number | 631.75 | 130.36 |
| Esters in 1st fraction | 493.50 | 119.68 |
| Esters in 2nd fraction | 96.45 | 7.04 |
| Esters in 3rd fraction | 11.97 | 7.04 |
| Esters in 4th fraction | 23.94 | 7.04 |
| Esters in 5th fraction | 344.96 | 21.12 |
| Esters in 6th fraction | 87.30 | 7.04 |
| Esters in 7th fraction | 11.97 | 7.04 |
| Esters in 8th fraction | 11.97 | 7.04 |

For the fifth fraction, the following specific observations were made:

| | Heavy rum | Light rum |
|---|---|---|
| Temperatures | 84.99 | 80.99 |
| Alcohol by volume | 29.40 | 19.08 |
| Volatile acidity | 18.79 | 3.41 |
| Esters | 344.96 | 21.12 |
| Aldehydes | 40.04 | 20.02 |
| Higher alcohols | 8.36 | 4.07 |
| Remarks | Oil drops | Oil drops |

These factors can be employed in estimates indicative of rum quality in that the quality is improved in the case of heavy rums in proportion as the ratio of high boiling point, high molecular weight esters and aldehydes to low boiling point, low molecular weight esters and aldehydes approaches unity. This ratio is very much lower (below 1:2) in the case of light rums. A heavy rum has a ratio surpassing 1:2, and for the better products of the instant procedure approaches and in some cases exceeds 1:1.

Organoleptic tests for aroma and taste have proved conclusively that the taste and aroma of the high boiling aromatic constituents are much superior to those of the low boiling ones. The "index of persistence" is from 4 to 18 times higher in the heavy rums than in the light rums.

These indications explain why good, genuine, heavy rums cannot be produced by merely letting a large amount of "head products" pass over with the main distillate, since these products are composed almost entirely of the esters and aldehydes of low boiling point and low molecular weight and having a low "index of persistence." It also explains why the incorporation of a seed of *Clostridium saccharobutyricum* or other proper organism to the fermentation under controlled chemical and biological conditions can result in great improvement of rum quality in aroma and flavor, since the acids produced by this bacterium form esters with the usual alcohols found in yeast fermenting media which are considered among the most valuable constituents of genuine rums, particularly the butyric acid esters.

The above described conditions are preferred, but obviously are not rigid conditions for all operations. When other sugar and alcoholic concentrations in the mash are selected as more convenient or desirable, care should be taken to provide that the sugars concentration must be at or below 6.0 grams of sugar per 100 ml. of mash and the alcoholic concentration in the fermenting mash is not over 8.0 percent for operation in the presence of *Clostridium saccharobutyricum*. In fact, the bacterial culture may be added after the yeast fermentation is almost finished, since the bacterium is able to utilize the untouched or residual sugars of the normal alcoholic fermentation in the elaboration of its own metabolic products; and this is feasible provided that the alcoholic concentration by volume is then below about 8.0 percent. When additional sugars in the form of thick mash are added during the finishing stages of fermentation, it is customary to effect the bacterial inoculation as early as possible during the primary alcoholic fermentation, since by so doing, the beneficial effects of the symbiotic fermentation have already taken place before the alcoholic concentration is increased due to the newly incorporated sugars to such a proportion as to inhibit further bacterial action.

The pre-treatment of the molasses is valuable in the preparation of such beverage rum, as the molasses is thereby cleaned of foul-smelling substances, such as gases and other volatile compounds usually in solution therein; and it is also rid of organic and inorganic impurities which are always present in the molasses, such as excess ash and molasses gums. The successive separations, firstly upon the heat and alkaline treatment, and secondly upon the sulphuric acid treatment, lead to a far-reaching improvement. The use of a supercentrifuge was found the most expeditious way of separating the impurities, but other means may be adopted, such as filter presses or other filtration methods, settling and decantation, etc.

The action of the heat during this pre-treatment renders the material practically free of microbiological contaminants, such as wild yeasts, molds, and bacteria of various kinds which are always present in the raw material. The total sugars concentration in the molasses is also increased through withdrawal of non-sugars, and the action of the heat and later the action of the sulphuric acid serves through inversion to increase the amount of readily fermentable monoses.

The addition of the milk of lime during the initial stage of the pre-treatment process has three main purposes:

(a) It prepares the medium for the development during fermentation of the most important ingredient in the aroma of heavy rums, being the essential oil or mixture of essential oils known as "rum oil."

(b) It neutralizes the free fatty acids which are always present in molasses, thus eliminating the danger of their volatilization during the heating operation which immediately follows, but permitting the re-liberation of these fatty acids from their calcium salts upon the sulphuric acid addition to the already cooled thick mash in the second stage of the pre-treatment, so that they are then available for the formation of valuable esters later during the fermentation period and under the catalytic action of the esterase produced by the yeast.

(c) The disturbance produced in the medium through the alteration in pH value occasioned by the milk of lime causes a copious precipitation of organic bases, molasses gums, and mineral ash constituents of the molasses, and this precipitation is enhanced by the action of the heat applied.

The nutrient requirements of the yeast and symbiotic bacteria are corrected at this stage when deficiencies are found upon analysis of the raw material, and physical improvements are also effected by which the unhandy, viscous, sticky molasses is converted into a more fluid, less viscous, and easily-handled mass, so that the mashing operations in producing the thin mash are greatly simplified. The aforesaid amounts of ammonium sulphate and calcium superphosphate are not restrictive or fixed, but are given as average values that have been found necessary when mashing Puerto Rican molasses. For other cases, preliminary analysis of the raw material and experimental observation will determine the amounts of the nutrients to be used.

The unusually short period of fermentation is due to various reasons, such as the favorable changes in the substrate resulting from the pre-treatment operation, the stimulating action of the bacteria on the yeast, and the strict chemical and biological control exercised during mashing and fermentation. The temperature range for fermentation previous to the incorporation of the bacterial culture may be maintained between 30 and 33 degrees C., as this range will insure optimum conditions for the yeast strains used in this type of fermentation for the stated initial concentrations of sugar and pH value of the mash. At the time of inoculation with bacterial culture, however, the temperature must be controlled within a range of 29 to 30 degrees C. and there maintained for keeping the bacterial culture from propagating too rapidly, as it would naturally do at higher temperatures, with possible detriment to the yeast propagation and metabolic processes. It has been found that when the propagation of the bacterial culture is such that the bacterium is present in large quantities and overpasses the concentration of yeast cells, then its activating action on the yeast is lost, and instead, deleterious influences are noted in the yeast propagation and metabolism.

It has been stated as preferable to employ a batch or discontinuous still for preparing the rum. Comparative chemical, physical and organoleptic tests have indicated this preference, as it normally provides the advantages of:

(a) A higher content of "rum oil," which is an aromatic compound or mixture of compounds of a true oily nature which passes over during the analytic fractionation of rums in the fifth and sixth fractions, and in the aforesaid distillation begins to distill over when the proof of the distillate is about 75.0 percent by volume (37.5 percent ethyl alcohol by volume). It possesses the characteristic aroma of aged rums. A chemical study of this valuable rum ingredient indicates that it does not belong to the aldehyde, ester, or higher alcohols groups. Physically, it is a highly refractive, colorless, oily substance or mixture, of unknown chemical composition, but apparently belonging to the terpenes. Its boiling range was found to be considerably higher than the boiling point of ethyl alcohol, and the "index of persistence" of its aroma was found to be extremely high. It is more soluble in alcohol than in water; and when it passes over in the fifth and sixth fractions, during fractionation of the rum sample, it may be observed in the form of oily droplets upon the surface of the liquid.

(b) A higher body is given to the rum.

(c) A higher content is obtained in the "non-alcohol number" of aromatic esters and aldehydes of the high boiling, high molecular weight variety.

(d) The rum has better flavor and aroma.

(e) The rum is remarkable higher in its "index of persistence" in aroma and taste.

(f) The rum matures faster during the aging period.

The analytic fractionation referred to above was effected by diluting a sample to an alcoholic content of 40 percent by volume, and fractionally distilling 840 ml. of the diluted sample under conditions by which eight successive fractions of 100 ml. each are taken off in successive periods of one hour each. The temperatures for the beginning and end of each fraction are noted, and the fractions are analyzed physically, organoleptically and chemically. The chemical analysis comprises determining: (1) volatile acidity (2) aldehydes (3) esters (4) higher alcohols (5) ethyl alcohol. During the research on the instant invention, it was found that most of the low-boiling low-molecular-weight esters and aldehydes passed over in the first fraction together with ethyl alcohol. Most of the higher alcohols (fusel oil) passed over in the fourth fraction. Most of the high-boiling high-molecular-weight esters and aldehydes passed over in the fifth fraction. The "rum oil" when present passed over in the fifth, sixth, seventh and eighth fractions.

Chemical studies of the distillation on the pilot plant batch still demonstrated that very valuable aromatic constituents begin to pass over when the proof of the distillate approaches around 70 to 75 proof, and also the valuable "rum oil" begins to pass over profusely at this stage of distillation. Hence, it has been pointed out as preferable to provide for reception of this fraction of the distillate in the main body receiver. The separation of "head products" and of the distillate fraction which passes over between 100 degrees and 70 degrees proof is preferred, as this greatly improves the commercial product or main body.

The combined procedures have the advantages of a comparatively short time for completion of the fermentation; unusually high yields and fermentation efficiencies; economy of floor space and labor with low capital investment; elimination of danger of fermentation failures; maintenance of high quality standards in the finished product; ability of the product to improve quickly with age; economy in shut-down periods for cleaning as the purification of the raw materials renders the necessity of scouring infrequent and effects savings in chemicals, labor and steam for the purpose; and residue by-products from yeast and potash salts are quickly obtained because of the absence of contamination and impurities.

The individual inventive steps each add to the efficiency and value of the procedure as a whole, and optimum results are obtained by employing them together, so that the combined effect is gained; but it will be understood that certain improvements are obtained by using one or more of them.

I claim:

1. A process of preparing heavy rums, which comprises removing excess ash and gums from a blackstrap molasses, initially fermenting a thin sterile mash thereof containing about 12 to 13 grams of total sugars per 100 ml. at a temperature of about 30 to 33 degrees C. by a heavy rum yeast of the genus *Schizosaccharomyces*, which is tolerant to concentrations of aliphatic acids of substantially pH 3.5 to 6.0 and is a producer of esterase, until a sugars concentration of 2 to 6 grams per 100 ml. and an alcohol content of about 3.5 to 6.0 percent by volume are obtained, introducing *Clostridia saccharobutyricum*, continuing the fermentation at a temperature of about 27 to 30 degrees C. while maintaining the pH above 5.0, and thereafter fractionally distilling the beer and recovering a second fraction obtained by removing a forerun of about 0.5 to 1.0 percent of the total volume of the distilling mash, said second fraction being terminated at a distillation proof of about 100 degrees, and mixing therewith a fourth distillate fraction comprising the condensate from distillation after the proof has dropped to about 70 to 75 degrees.

2. A process as is claim 1, in which the ash and gums are removed from the blackstrap molasses by increasing the pH about 0.5 and maintaining the material heated at 80 to 85 degrees C. for at least fifteen minutes at a density of around 60 to 65 degrees Brix, separating precipitated impurities, then cooling and adjusting to about pH 5.5 to 5.6, and separating precipitated impurities.

3. A process as in claim 1, in which a thick mash of sterile blackstrap molasses is added to the initial symbiotic fermentation after the sugar concentration thereof has been reduced to a value of about 2.0 to 2.5 grams per 100 ml. of mash, and continuing the fermentation until the alcohol content is essentially between 9.0 and 10.0 percent by volume.

4. A process as in claim 1, in which the beer is subjected to heating to evaporation with a total reflux for about 1 to 2 hours prior to the fractional distillation.

5. A process as in claim 1, in which the beer is allowed to rest from about 12 to 18 hours prior to distillation.

6. A process of preparing heavy rums, which includes the steps of firstly fermenting a sterile molasses mesh containing about 12 to 13 grams of total sugars per 100 ml. at a temperature of about 30 to 33 degrees C. by a heavy rum yeast of the genus Schizosaccharomyces which is tolerant to concentrations of aliphatic acids of substantially pH 3.5 to 6.0 and is a producer of esterase and, when the total sugars have been reduced below 6 grams per 100 ml., introducing *Clostridia saccharobutyricum*, and containing the fermentation at a temperature of 27 to 30 degrees C. in symbiotic association of the yeast and bacteria while maintaining the pH above 5.0.

7. A process as in claim 6, in which a thick sterile mash of blackstrap molasses is introduced during the symbiotic fermentation period.

8. A process as in claim 6, in which the blackstrap molasses is primarily purified by alkalizing to increase the pH value by about 0.5 and heating and removing precipitates, then yeast nutriment is added thereto and acid added to bring the pH value to about 5.5 to 5.6 with cooling, and separating a further precipitate, said successive alkalization and acidification being effective for holding the existing organic acids in unevaporated form in the mash during heating and for releasing said acids prior to initiation of fermentation.

9. A process of preparing heavy rums, which comprises preparing and preserving a high content of high molecular weight, high boiling aldehydes and esters by the steps of initially subjecting a blackstrap molasses to an ethanol fermentation at a pH of substantially 5.5 to 5.6 and a temperature of about 30 to 33 degrees C. by a heavy rum yeast of the genus Schizosaccharomyces which is tolerant to concentrations in aliphatic acids of substantially pH 3.5 to 6.0 and is a producer of esterase, thereafter introducing *Clostridia saccharobutyricum*, continuing the fermentation while maintaining the pH at substantially 5.5 to 5.6; and thereafter subjecting the beer to a fractional distillation, removing 0.5 to 1 percent of the total mash under distillation as a first fraction or forerun and also removing a third fraction which is evolved while the distillation proof is between 100 and 70 degrees, the combined removed first and third fractions amounting to from 10 to 15 percent of the total volume of distillate, and collecting the remaining second and fourth fractions to form a main body of heavy rum of 130 to 150 degrees proof.

10. A process as in claim 9, which includes mixing and diluting the forerun and the third fraction to form a combined medium containing about 20 percent of alcohol by volume, and then redistilling fractionally as before and collecting the second and fourth fractions of this second-run distillation.

11. A process of preparing heavy rums, which comprises removing excess ash and gums from blackstrap molasses, initially fermenting a thin, sterile mash thereof containing about 12 to 13 grams of total sugars per 100 ml. at a temperature of about 30 to 33 degrees C. by a heavy rum yeast of the genus Schizosaccharomyces which is tolerant to aliphatic acid concentrations at a pH of 3.5 to 6.0 and is a producer of esterase, until a sugars concentration of 2 to 6 grams per 100 ml. and an alcohol content of about 3.5 to 6.0 percent by volume are obtained, introducing *Clostridia saccharobutyricum*, continuing the fermentation at a temperature of about 27 to 30 degrees C. while maintaining the acidity above pH 5.0, and thereafter fractionally distilling the beer and recovering a second fraction obtained after removing a forerun of about 0.5 to 1.0 percent of the total volume of the distilling mash, said second fraction being terminated at a distillation proof of about 100 degrees, together with a fourth fraction comprising the condensate from distillation after the proof has dropped to about 70 to 75 degrees, and mixing said second and fourth fractions.

RAFAEL ARROYO.